United States Patent
Holcomb

(10) Patent No.: US 11,196,331 B2
(45) Date of Patent: Dec. 7, 2021

(54) COMPACT HIGH-EFFICIENCY, LOW-REVERSE TORQUE ELECTRIC POWER GENERATOR DRIVEN BY A HIGH EFFICIENCY ELECTRIC DRIVE MOTOR

(71) Applicant: HOLCOMB SCIENTIFIC RESEARCH LIMITED, Dublin (IE)

(72) Inventor: Robert Ray Holcomb, Sarasota, FL (US)

(*) Notice: Subject to any disclaimer, the term of this patent is extended or adjusted under 35 U.S.C. 154(b) by 15 days.

(21) Appl. No.: 16/474,052

(22) PCT Filed: Dec. 21, 2017

(86) PCT No.: PCT/EP2017/084100
§ 371 (c)(1),
(2) Date: Jun. 26, 2019

(87) PCT Pub. No.: WO2018/122098
PCT Pub. Date: Jul. 5, 2018

(65) Prior Publication Data
US 2019/0393765 A1   Dec. 26, 2019

Related U.S. Application Data

(60) Provisional application No. 62/498,400, filed on Dec. 27, 2016.

(51) Int. Cl.
*H02K 53/00* (2006.01)
*H02K 11/30* (2016.01)
(Continued)

(52) U.S. Cl.
CPC ............. *H02K 53/00* (2013.01); *H02K 7/116* (2013.01); *H02K 11/0094* (2013.01);
(Continued)

(58) Field of Classification Search
CPC ........ H02K 53/00; H02K 11/30; H02K 7/116; H02K 11/0094; H02K 16/02; H02K 31/02; H02K 31/00; H02K 99/00
(Continued)

(56) References Cited

U.S. PATENT DOCUMENTS

| | | | |
|---|---|---|---|
| 10,008,916 B2* | 6/2018 | Holcomb | H02K 53/00 |
| 2003/0025420 A1* | 2/2003 | Noble | H02K 31/02 |
| | | | 310/232 |

(Continued)

FOREIGN PATENT DOCUMENTS

WO    WO-2013/171728 A2    11/2013

OTHER PUBLICATIONS

Khan Academy, "Diffraction and constructive and destructive interference", printed on Jul. 29, 2021.*

(Continued)

*Primary Examiner* — John K Kim

(57) ABSTRACT

A generator with reduced reverse torque which may be used as a singular, point of use, compact electric generator that produces power with high efficiency and very low reverse torque. The generator comprising a stator having slots and stator coils and a series of slot rotors placed in relation to the stator coils such that minimal destructive interaction is caused between magnetic fields of each rotor and induced magnetic fields of the stator when the power generator is connected to an electric load with at least a portion of that power being sent to a storage device where a portion of the stored power is provided to excitation circuitry utilized to re-excite a motor to drive the slot rotors.

29 Claims, 8 Drawing Sheets

(51) Int. Cl.
 *H02K 7/116* (2006.01)
 *H02K 11/00* (2016.01)
 *H02K 16/02* (2006.01)
 *H02K 31/02* (2006.01)

(52) U.S. Cl.
 CPC ............. *H02K 11/30* (2016.01); *H02K 16/02*
 (2013.01); *H02K 31/02* (2013.01)

(58) Field of Classification Search
 USPC ...................................................... 310/68 R
 See application file for complete search history.

(56) References Cited

U.S. PATENT DOCUMENTS

| | | | | |
|---|---|---|---|---|
| 2012/0206002 A1* | 8/2012 | Holcomb | ............. | H02K 21/029 |
| | | | | 310/113 |
| 2012/0206003 A1* | 8/2012 | Holcomb | ............... | H02K 53/00 |
| | | | | 310/114 |
| 2013/0002077 A1 | 1/2013 | Conde Mendez | | |
| 2019/0393765 A1* | 12/2019 | Holcomb | ............... | H02K 31/02 |

OTHER PUBLICATIONS

International Search Report and Written Option, PCT/EP2017/084100, dated Apr. 10, 2018, 11.

* cited by examiner

COMPACT HIGH-EFFICIENCY, LOW-REVERSE TORQUE ELECTRIC POWER GENERATOR DRIVEN BY A HIGH EFFICIENCY ELECTRIC DRIVE MOTOR

FIELD OF INVENTION

Systems and methods for generation of current with reduced electromagnetic drag, commonly referred to as reverse torque, thereby improving the operating efficiency of a generator.

BACKGROUND

Rapid depletion of the Earth's fossil fuel sources along with environmental pollution and climate change makes obvious the clear need for alternative energy supplies. The rapid expansion in the area of electronic information technology and communication services increases the demand and makes small, point of use, stand-alone power supplies desirable.

A significant contribution to safely resolving Earth's population's demand for increasing energy consumption, including in the area of information management and communications, is to increase the efficiency of electric power generation by removing reverse torque from electric power generators of all sizes, from megawatt sizes down to fractions of a watt. Removal of reverse torque from generators associated with converting mechanical energy into electrical power can provide an opportunity for electrically powered, high efficiency generators for a multitude of sizes and applications. Removal of the reverse torque allows a generator to operate with 400-500% increase in efficiency. This permits the opportunity to drive the generator with a smaller electric driver and, therefore, greatly improve the generator's efficiency.

The World's first known electrical generator was Faraday's disk dynamo. Michael Faraday discovered the operating principle of electromagnetic generators in the years 1831-1882. These observations were later reduced into a principle called Faraday's Law by James Clerk Maxwell, a mathematician and physicist from Edinburgh, Scotland. The law simply states that an electromagnetic force is generated in an electrical conductor that encircles a varying magnetic flux. Faraday built the first magnetic rotary induction generator called a Faraday Disc. This first machine was a type of homo-polar generator, using a copper disc rotating between the poles of a horseshoe magnet. This generator produced a small DC voltage but high amperage. The Faraday dynamo or uni-pole (or uni-polar) generator, however, does not lend itself well to practical commercial development because of the nature of its output, i.e., very low DC voltage at extremely high current. The Faraday generator does lend itself well, however, to the study the mechanisms of reverse torque in electrical induction machines.

Conventional generators in use today require, by definition, 1 horsepower of kinetic energy input to generate 746 watts (W) of electrical energy. This relationship of mechanical horsepower to electrical watts involves derived units of power which have evolved from observations and measurements on physical and electrical machines (as well as horses).

The term "watt" was named after James Watt, a Scottish scientist, for his work on improving the steam engine and quantifying the power of the steam engine. The unit "watt" was recognized by the Second Congress of the British Association for the Advancement of Science in 1889, concurrent with the start of commercial power production. The dynamo was the first electrical generator capable of delivering power to industry and is still an important generator in use even to this day. The dynamo uses a particular machine design and electromagnetic principles to convert mechanical rotation into an alternating electric current. The first commercial power plants which were operated in Paris in the 1870's were designed by Zenobe Gramme. The use of electric generators made it desirable to establish a common unit for electrical power in order to standardize this newly evolving energy source. The watt is a derived unit of power (i.e., an algebraic combination of base units). The watt is now an approved unit of the International System of Units (SI).

As defined, 1 watt is the rate at which work is done when an object's velocity is held constant at 1 meter per second against a constant opposing force of 1 Newton.

$$W=J/S=N\cdot M/S=Kg\cdot M^2/S^3$$

J=Joule M=Meter N=Newton Kg=Kilogram

Joule=Work done when a force of 1 Newton is displaced through a distance of 1

Meter

1 Joule=1 watt-second, $10^7$ ergs=0.2390 calories or 0.738 ft-lb.

Therefore, if one mechanical horsepower (HP) is equal to 550 ft-lb per second (or 33,000 ft-lb per minute), then by definition of the watt being 0.738 ft-lb per second, 1 HP=550 ft-lb per second/0.738 ft-lb per second=745.257 watts. Therefore, by definition, the electrical watt is the rate at which work is done when 1 ampere (A) of current flows through an electric potential difference of 1 volt (V):

$$W=V\times A$$

745.257 watts=27.299 V×27.299A or any combination of amps and volts in which the product is equal to 745.257 watts. Therefore by definition and derivation, 1 HP=746 watts The original work on which these standards units hinge was performed by James Watt who introduced the term "horsepower" when he wanted to explain how powerful his steam engines were compared to horses. After some tests (not with engines, rather with horses), he established that, on average, the horses being used could pull coal up a mine shaft at the rate of 22,000 ft-lb per minute. For whatever reason, he decided to raise this number by 50% and arrived at a number which is commonly accepted as 33,000 ft-lb per minute. So, if an engine or any rotary machine can push 33,000 lbs. of something 1 foot in 1 minute, the machine is considered a 1 HP engine.

As noted above, a conventional generator requires, by definition and measurement, 1 HP to generate 746 watts plus enough additional horsepower to turn the physical mechanisms of the rotor at proper speed to maintain the desired frequency. The horsepower required to spin the mechanism is usually about 0.2 HP in a conventional generator to generate 746 watts for a total 1.2 horsepower to generate 746 watts, although only 0.2 HP of that energy is used to actually generate electrical power. The remaining 1 HP which is equal to 746 watts is required to overcome the reverse torque or so-called "back electromotive force" (back EMF).

The back EMF or reverse torque of rotary generators in use today can best be described by reference to "Lenz's Law." It, in summary, states that when an EMF is generated by a change in magnetic flux according to Faraday's Law, the polarity of the induced EMF is such that it produces a current whose magnetic field opposes the magnetic flux which produces it. The induced magnetic field inside any loop of wire always acts to keep the magnetic flux in the loop constant. If the magnetic field B is increasing, the induced magnetic field acts in equal and opposite direction to it; if it is decreasing, the induced magnetic field acts in the direction of the applied field with equal force. In conventional generators, the rotor is stationed inside the coil loops of the stator and, thus, the rotor generates a current which in turn generates a magnetic field which is equal in force and opposite in polarity. Therefore, reverse torque is a product of the design.

In the case of the generator of the present disclosure, the rotors are outside of the coil loop and, therefore, do not interact with the induced pole. This induced pole is induced by current flow and is not responsible for a current flow, as is evidenced by the fact that the generator reaches full voltage prior to current going to an electrical load.

Due to the reverse torque, in a conventional generator about 85% more mechanical energy is required to turn the rotor than is required to generate power. However, in the case of the generator of the current disclosure, it only requires energy to turn the mechanical mechanisms of the generator or about 20% of output power to drive the generator. Therefore, the system takes the needed 20% and cycles it back to drive the generator and the remaining 80% is usable electric power to be used for whatever purpose is required.

In conventional generators, as noted above, the rotor is stationed inside the coil loops of the stator. Therefore, the rotor generates a current which in turn generates a magnetic field which is equal in force and opposite in polarity, hence reverse torque is a product of the design. The Lenz losses are related to inductive coupling between the rotor standing poles and the stator induced poles. Concerning efforts to reduce reverse torque, Nikola Tesla published an article entitled "Notes on an Unipolar Dynamo", Nikola Tesla, The Electrical Engineer, N.Y. Sep. 2, 1891. Tesla reported upon a modification of the Faraday Dynamo design. The design varied in two major ways:
1. First, he used a magnet that was bigger in diameter than the disc, so that the magnet completely covered the disc.
2. Second, he divided the disc into sections with spiral curves out from the center of the outside edge.

The Tesla modification caused the current to make a full trip around the outside edge of the disc. Because the current is flowing in a large circle at the rim of the disc, the magnetic field created does not work against the inducing/ standing pole. This modification eliminated a significant problem of electric power generation, i.e., the reaction to every action or, as is commonly called, reverse torque or back EMF.

This design change and its effect on reverse torque were accomplished by geometric isolation of the standing pole from the induced pole of the machine. In the case of the generator of the current disclosure, the rotors are outside of the induction coil loop. Therefore, the standing coils of the rotor are geometrically isolated from the induction coils of the stator. The induced pole is induced by current flow which is generated by the standing pole. Again, the induced pole is in no way responsible for current flow or power generation in the induced coils. This design change removes Lenz losses produced by the induced stator poles attracting and repelling polar coupling between the stator poles and the rotor poles. To the extent that stator coupling occurs, it will act to produce additional magnetic drag upon the rotor which is linearly proportional to the load current drawn and thereby satisfy Lenz's Law.

SUMMARY

Consistent with the present disclosure, systems and methods are provided for a generator with reduced reverse torque which may be used as a singular, point of use, compact electric generator that produces power with high efficiency and very low reverse torque.

In accordance with exemplary embodiments, a system is provided for generating power with a reduced reverse torque. For example, a power generator comprises a stator having slots and stator coils; a series of slot rotors placed in relation to the stator coils such that minimal destructive interaction is caused between magnetic fields of each rotor and induced magnetic fields of the stator when the power generator is connected to an electric load. The generator includes first members of the slot rotors that are distributed along the outer periphery of a first stator section having induction windings accommodated in the stator slots, and the slots of the first stator section are axially aligned along a lengthwise and depthwise axis. The first members of slot rotors contain permanent magnets that have a first magnetic polarity on the 360° external face of the slot rotors and a second polarity on the inner face for 360°, and the slot rotors are distributed along the outer periphery alternating in polarity from first magnetic polarity to second magnetic polarity. The slot rotors are rotated in such manner that the first pole having a first magnetic polarity and the second pole having a second magnetic polarity are located in geometrically adjacent corners of the stator body.

Before explaining certain embodiments of the present disclosure in detail, it is to be understood that the disclosure is not limited to the arrangements of the components set forth in the following description or illustrated in the drawings. The disclosure is capable of embodiments in addition to those described and of being practiced and carried out in various ways. Also, it is to be understood that the phraseology and terminology employed herein, as well as in the abstract, are for the purpose of description and should not be regarded as limiting.

As such, those skilled in the art will appreciate that the conception and features upon which this disclosure is based may readily be utilized as a basis for designing other structures, methods, and systems for carrying out the several purposes of the present disclosure. Furthermore, the claims should be regarded as including such equivalent constructions insofar as they do not depart from the spirit and scope of the present disclosure.

BRIEF DESCRIPTION OF THE DRAWINGS

The accompanying drawings, which are incorporated in and constitute part of this specification, and together with the description, illustrate and serve to explain the principles of the exemplary embodiments disclosed herein. In the drawings.

DETAILED DESCRIPTION

Figure 1:
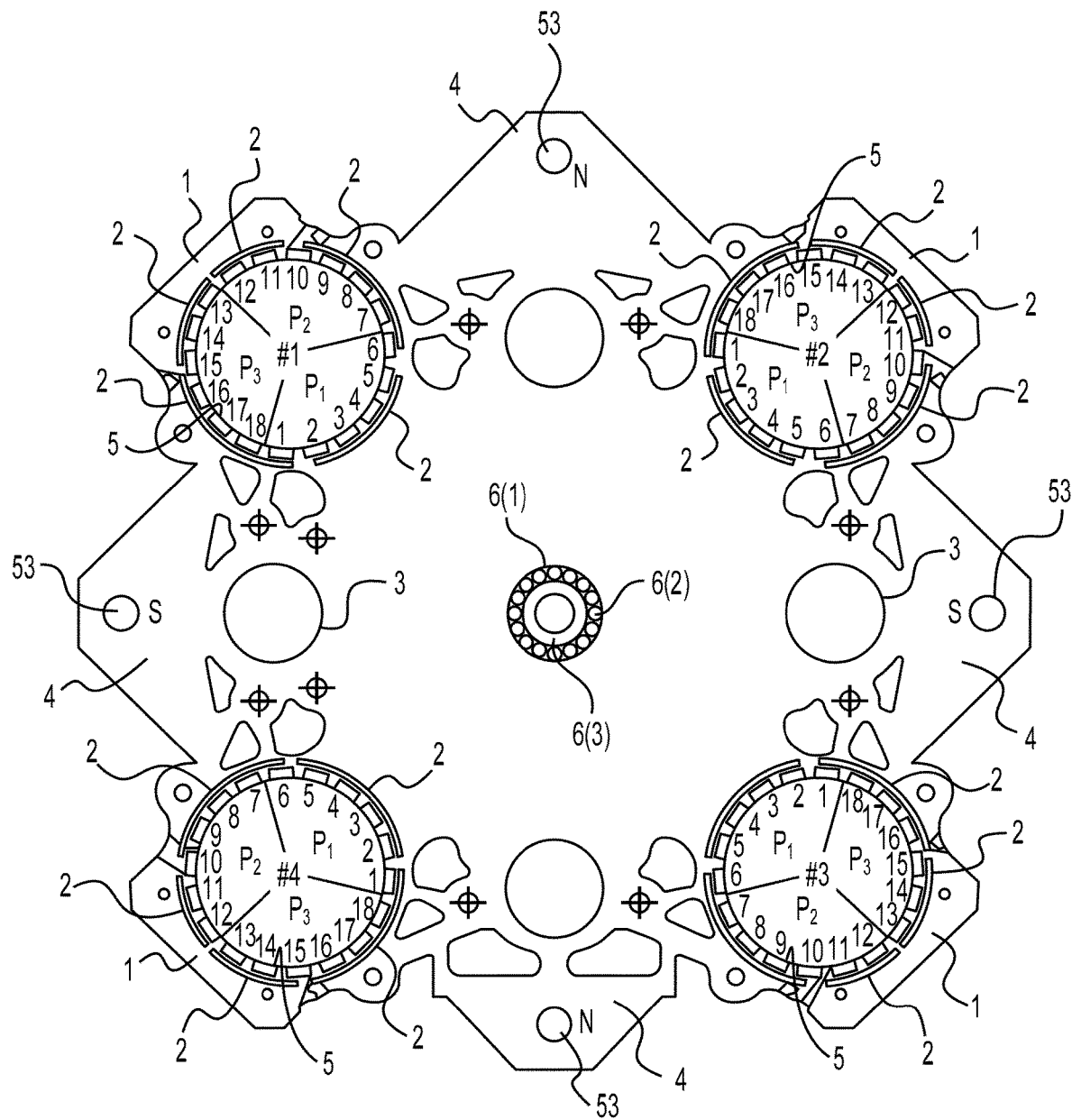
FIG. 1 is a diagram illustrating a cross-sectional view of an exemplary stator of the generator disclosed herein revealing a geometric arrangement of rotor cavities, wire slots, and rotor mu metal shielding, consistent with embodiments of the present disclosure.

Embodiments herein include systems and methods. At least some disclosed methods may be executed, for example, by at least one processor that receives instructions from a non-transitory computer-readable storage medium. Similarly, systems consistent with the present disclosure may include at least one processor and memory, and the memory may be a non-transitory computer-readable storage medium. As used herein, a non-transitory computer-readable storage medium refers to any type of physical memory on which information or data readable by at least one processor may be stored. Examples include random access memory (RAM), read-only memory (ROM), volatile memory, non-volatile memory, hard drives, CD ROMs, DVDs, flash drives, disks, and any other known physical storage medium. Singular terms, such as "memory" and "computer-readable storage medium," may additionally refer to multiple structures, such a plurality of memories and/or computer-readable storage mediums. As referred to herein, a "memory" may comprise any type of computer-readable storage medium unless otherwise specified. A computer-readable storage medium may store instructions for execution by at least one processor, including instructions for causing the processor to perform steps or stages consistent with an embodiment herein. Additionally, one or more computer-readable storage mediums may be utilized in implementing a computer-implemented method. The term "computer-readable storage medium" should be understood to include tangible items and exclude carrier waves and transient signals.

Embodiments of the present disclosure provide numerous advantages over prior systems and methods. For example, exemplary embodiments are discussed and described herein involving aspects of an electric machine, such as a generator that produces power with high efficiency and very low electromagnetic drag. The relevance of elimination of the drag to its uses and applications is presented and discussed. For example, embodiments of the present disclosure provide systems and methods for a generator design virtually free of reverse torque due to a number of design changes when compared to a conventional electric rotary generator. These design features, including Geometric Isolation, Singular Stator Winding Pattern, Shielding, and Unique Rotor Design, are explained next.

Geometric Isolation: Each stator armature induction coil can be located in two separate rotor cavities, such that only one side of a stator coil is in close proximity to a first magnetized rotor, while the opposite side of the coil is in close proximity to a second magnetized rotor. Both rotors are outside of a closed induction loop. Reverse torque of a conventional generator may be formed when a single rotor excites both sides of a stator coil, one being at least one north pole and the other at least one south pole. Based on Lenz's Law, there is an induced current in a closed loop if the magnetic flux through the loop is changing. The direction of the induced current is such that the induced magnetic field opposes a change in flux. In the case of the present disclosure, however, the magnetic field of the rotor is geometrically removed and isolated from a magnetic axis or center line of a stator magnetic pole. Therefore, reverse torque does not occur to any significant extent due to this geometric separation of the would-be opposing magnetic poles.

Singular Stator Winding Pattern: A stator armature may be wound with lapping coils in wire slots such that a direction of current flow in the lapping coils is identical in all slots of an individual rotor cavity. However, as the coils exit stator induction slots, the coils are physically wound in opposite directions thereby creating opposite magnetic polarities and effectively canceling available magnetic polarity which may otherwise form a small amount of reverse torque.

Shielding: A stator armature iron also contains a series of mu metal shields between wire slots, which allow flux linkage between narrow segments of side iron and back iron and a uni-pole rotor flux such that an armature coil inductive power generation may be attained. However, no significant reverse torque is developed.

Unique Rotor Design: The modified pole rotor is a singular uni-polar (functioning as a single-pole) rotor. The rotor does not exhibit a detectable magnetic center pole or center line which could tend to line up on small magnetic poles of the stator and thereby develop some counter torque. The first and second magnetic poles can be permanent fixed poles on 360° of rotor surface.

In accordance with an aspect of the disclosed generator, a method is disclosed for reducing drag in an electric generator that includes a unique geometric design of the stator and placement of a unique series of uni-polar rotors in relation to the stator coils along with a system of magnetic shielding which results in minimal destructive interaction of the rotor magnetic fields with the magnetic fields of the stator when the generator is connected to an electric load. The design includes distributing first members of slot rotors along the outer periphery of a first stator section having induction windings accommodated in stator slots. The slots of the first stator section are axially aligned along a lengthwise and depthwise axis. The first members of slot rotors contain permanent magnets that have a first magnetic polarity on the 360° external face of the rotor and the second magnetic polarity on the inner face adjacent to the rotor shaft. The slot rotors distributed along the outer periphery are distributed in alternating polarity from first magnetic polarity to second magnetic polarity. The slot rotors may be rotated in such manner that the first pole having a first magnetic polarity and the second pole having a second magnetic polarity are located in geometrically adjacent corners of the stator, such that a first side of a stator armature coil is excited by a first magnetic polarity, a second side of a stator armature coil is excited by a second magnetic polarity such that maximum moving flux density is provided in the induction windings to induce a DC current to flow therein. The rotor magnetic fields are magnetically shielded such that magnetic drag resulting from magnetic interaction between the rotors and stator is minimized.

According to some embodiments, the present disclosure presents a method and apparatus for reducing the electromagnetic drag in a miniature electric generator to improve efficiency and simultaneously allow a constant power supply for miniature applications, such as cellular phones, smart phones, computers, implantable medical devices, and the like.

In an embodiment of the current disclosure, distributed slot rotors rotate in a close proximity to aligned wire slots disposed around the circumference of a miniature stator of an electric power generator.

According to an embodiment, means are revealed to provide a uni-polar permanent magnetic rotor in order to place maximum flux into the wire slots of the stator.

According to some embodiments of the current disclosure, the structure of laminated steel and/or graphene or other suitable material is used in a stator such that a uniform ferro magnetic environment is created surrounding the uni-polar magnetic rotor.

According to some embodiments of the current disclosure, the high efficiency generator demonstrates the release of energy which would otherwise be consumed by electromagnetic drag forces by specific geometric location and shielding of distributed slot rotors in the generator.

Some embodiments of the current disclosure reveal an alternating lap winding pattern of the stator to shield the uni-polar rotors from the magnetic fields of the stator when the generator is connected to an electrical load.

Some embodiments of the current disclosure reveal the use of the small high efficiency generator as part of a stand-alone, high efficiency electric power source for cellular phones and other electronic information devices.

Some embodiments of the current disclosure provide distributed slot rotors that rotate in a close proximity to align and skew wire slots disposed around the circumference of a stator of a miniature power generator.

Some embodiments of the current disclosure provide equally spaced wire slots for 360° in the rotor cavities with narrow openings into larger slots which contain wound magnetic wire. This arrangement aids in the control of permeance harmonics.

Some embodiments of the current disclosure provide a skew in the slot alignment equal to at least the width of the tooth between the slots sufficient to control permeance harmonics in the air space between the magnetized rotors and the stator iron of the rotor cavity.

Some embodiments of the current disclosure demonstrate a means to complete an intensified magnetic circuit and place maximum flux into wire slots, the side iron, the stator tooth and back iron using uni-polar slot rotors.

Some embodiments of the current disclosure demonstrate the use of uni-polar rotors, with one side of each coil excited by the first polarity and the second side of the coil excited by the second polarity such that DC current is generated.

Some embodiments of the current disclosure reveal the mechanism and design of the stator such that energy input is released as usable electric power which would otherwise be dissipated or consumed by electromagnetic drag forces.

Some embodiments of the current disclosure reveal the method by which the rotor magnetic forces are separated from the stator induction magnetic forces by specific geometric locations and shielding of the distributed slot rotors as well as by the unique winding pattern of the stator which effectively shields and cancels significant magnetic poles in the stator.

Some embodiments of the current disclosure reveal the use of a very low electrical conductor wire to wind both the stator and the rotors with significant increases in power output to an electrical load.

Some embodiments of the current disclosure reveal methods for the release of energy which would be consumed or dissipated by electromagnetic drag forces, this methodology being specific geometric location and shielding of distributed slot rotors in a high efficiency generator.

Some embodiments of the current disclosure reveal the use of superconductor material with very low resistance to electron flow to wind the stator of the unit and thereby increase the power output by a significant amount.

Some embodiments of the current disclosure utilize high conductivity or superconductive materials such as but not limited to graphene or ceramic or other high temperature superconductors to aid in the function of the unit of a stand-alone power source for all applications.

Some embodiments of the current disclosure reveal the use of the high efficiency generator to power electronic notebooks, laptop computers, desktop computers, e-readers, electronic tablets, and the like.

Some embodiments of the current disclosure reveal the use of the high efficiency generator to power implantable medical devices.

Some embodiments of the current disclosure reveal the use of the high efficiency generator to power any and all small power applications.

Some embodiments of the current disclosure use graphene and/or other substances or materials as superconductors, high-capacity capacitors, and super efficient ferro magnetic materials to enhance electromagnetic induction with small physical size and lighter weight generating devices.

In accordance with various exemplary embodiments discussed and described and by way of brief summary, an exemplary high efficiency mini electric generator unit eliminates or greatly reduces electromagnetic drag or reverse torque so that upwards of 80% of the driving energy which conventionally is consumed and/or dissipated by magnetic drag is converted to electric power. In accordance with the embodiment as will be described in greater detail in connection with the illustrations below, the classic rotor or armature and stator have been replaced by a laminated electrical steel or laminated graphene stator. The stator section has, in one example, 18 wire slots that are magnetically coupled with individual slot rotors in adjacent corners of the stator. In a preferred embodiment, the stator section has, 18 wire slots that are geometrically spaced in the corner of a square or rectangle or the like and are magnetically coupled with individual slot rotors of adjacent slot rotors.

The slot rotors can be constituted of, for example, a permanent magnetic uni-pole for 360° of their outer surfaces. The slot rotors are positioned in close proximity to the wire slots in order for each rotor to form a closed magnetic circuit with the stator slot tooth, side iron, and back iron in order to allow maximum moving magnetic flux across the induction coils. Therefore, the shielding, geometric isolation, and winding patterns allow only minimal to no electromagnetic drag upon the slot rotors.

To drive the shafts of the slot rotor mechanism, a central gear wheel mechanism may be employed at one end of the individual slot rotor shafts over the inner or outer circumference of the stator. As the slot rotors are rotated on both sides of the stator by the central gear mechanism, the step-up speed from the central gear to the rotor shaft has an increased speed of 10-fold or 1:10 gear speed ratio and power can be generated with greatly reduced drag as compared with a single central rotating armature of a conventional generator.

The shafts of the slot rotor mechanisms may be driven by employing an electric high efficiency motor which is driven by multiple isolated magnetic poles in electromagnets which are sequenced by a programmable logic center (PLC) and relay mechanism such that magnetic drag or reverse torque on the driver mechanism does not exist. Power generation in accordance with the reduced electromagnetic drag provided by various embodiments discussed and described herein can result in, for example, 4 to 5-fold increase in electrical energy output with the same mechanical or kinetic energy input.

Reference will now be made in detail to the exemplary embodiments implemented according to the disclosure, the examples of which are illustrated in the accompanying drawings.

FIG. 1 is a diagram illustrating an exemplary cross-sectional view of an exemplary stator of the generator revealing a geometric arrangement of the rotor cavities, stator wire slots, and rotor mu metal shielding. Laminate 4 contains rotor cavities #1, #2, #3, and #4. The rotor cavities contain stator wire slots 5 and are surrounded mu metal shielding 2. Each rotor cavity contains 18 wire slots, but not limited to 18 wire slots, 1-6, 7-12, and 13-18 for coil sets $P_1$, $P_2$, $P_3$, respectively. Rotor caps 1 are put in place after the rotor cavity slots are wound. Laminate 4 also contains cavity 6(1) designed to receive bearing mechanism 6(2) of central drive shaft 6(3). Alignment holes 3 are also for compression after the laminates of the generator are stacked. Cavities 53 are used as support bolt holes which are used as support of other portions of the generator, including its driving mechanism described below, and for additional compression of the laminates.

The stator is of appropriate thickness and is constructed of laminated electrical steel, laminated graphene, or like material. The stator wire is, for example, copper, aluminum, graphene, or high temperature super conductor material such as ceramic. In a preferred embodiment the stator section can have substantially a square shape, but not confined to a square shape, with the rotor cavities located in the corners of the square, where the stator section is concentric about the longitudinal axis. The embodiment is preferred, but not restrictive, in that in affords geometric isolation from the magneto-motive poles in the stator thereby reducing the drag forces between the stator and the magnetized rotors.

Figure 2:
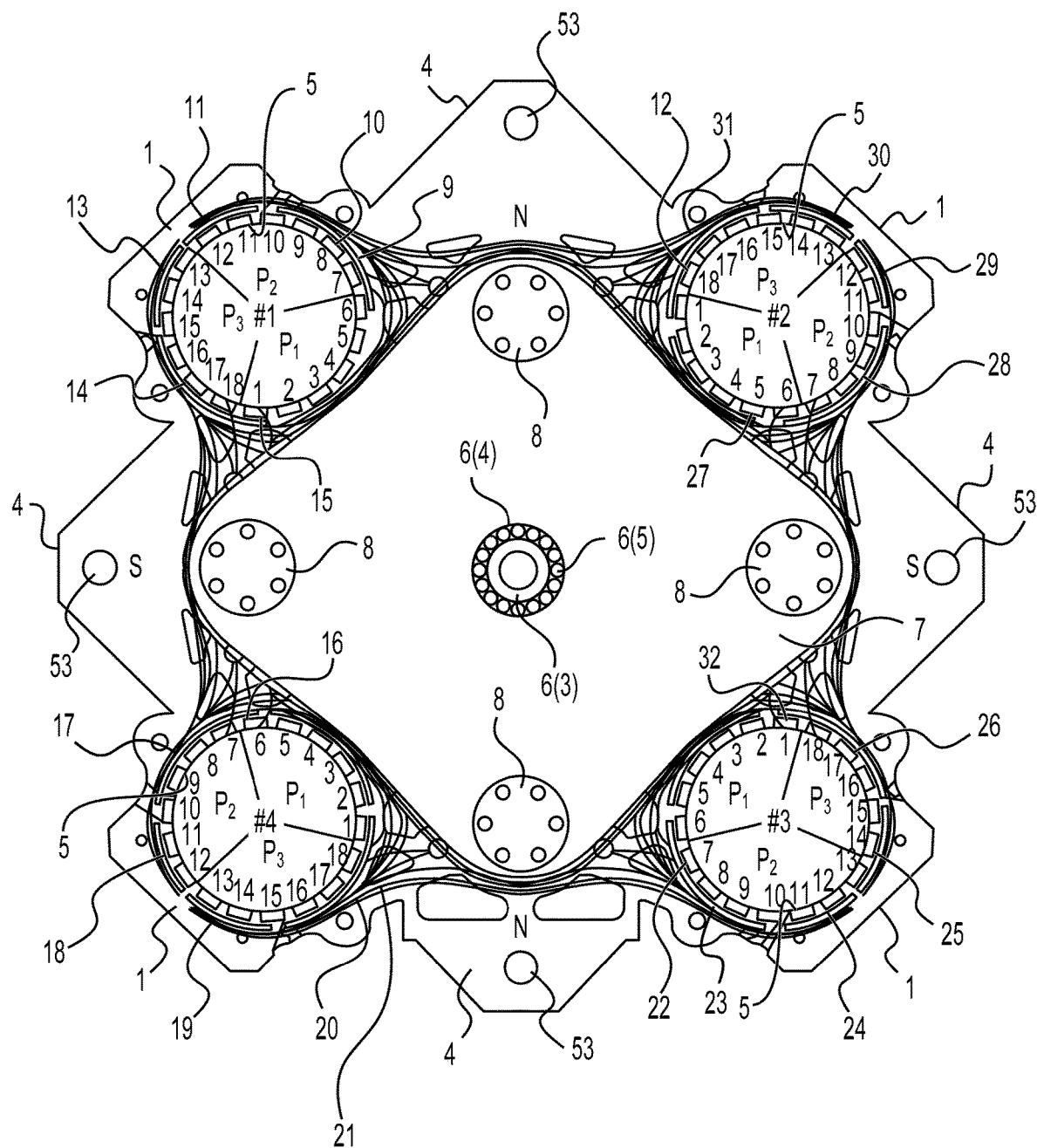
FIG. 2 is a diagram illustrating a cross-sectional view of an exemplary end portion revealing a geometric arrangement of the rotor cavities, wire slots with stator winding in place along with mu metal shielding, a stator end compression plate, and a central drive shaft, consistent with embodiments of the present disclosure.

FIG. 2 represents a diagram illustrating an exemplary cross-sectional view of an exemplary drive end portion of the stator revealing the geometric arrangement of the rotor cavities, wire slots and stator induction windings in place along with mu metal shielding, exemplary stator end compression plate 7, and drive shaft 6(3). Compression caps 8, in conjunction with compression plate 7, are used to compress and support generator's the stacked laminates.

The stator slot windings as shown in FIG. 2 are wound such that electromagnetic drag forces are cancelled by coils that are in the same sector but with current running in the opposite direction. The first polarity of stator slots and the second polarity may contain up to 48 slots, but not restricted nor limited to 48, without increasing the drag forces or departing from the teachings of the invention. The slots are wired such that the 360° of slots are wound in a counter-clockwise direction and are lapped by 360° slots wound in a clockwise direction. Therefore, the induced north pole cancels the induced south pole, thereby electromagnetically isolating the rotor magnetic field from the induced potential stator magnetic field. The N's and S's in FIG. 2 indicate the polarities of the stator winding patterns.

The stator slot windings as shown in FIG. 2 are wound such that the electromagnetic drag forces are cancelled by two lapping coils which are wound with side #1 of the stator coils in the wire slots in the same sector of the stator such that current flows in the same direction in the slots but exits the wire slots in such a fashion that side #2 of the two lapping coils is wound in two different adjoining stator sectors. For example, side #1 is wound in rotor cavity #2 and side #2 of one of the overlapped coils is wound in rotor cavity #1 with the second side of the second lapping coil being wound in rotor cavity #3. Therefore, the winding pattern forms two opposite magnetic poles which cancel each other within the rotor cavity. In this example, in FIG. 2, there are coil sets $P_1$, $P_2$, $P_3$ and each set contains six coils. The six coils are connected in series and each coil set is connected in series, therefore when the four rotors are in operation the unit generates DC power. For example, coil group 1 in and out leads 12/22, 26/17, 31/15, and 9/27. Coil group 2 in and out leads include 11/28, 30/23, 24/20, and 18/10. Then coil group 3 in and out leads include 20/25, 26/19, 21/13, and 14/29. An exemplary generator with the above described configuration may operate with uni-pole rotors in DC mode and may be connected in series and/or in parallel.

Figure 3:
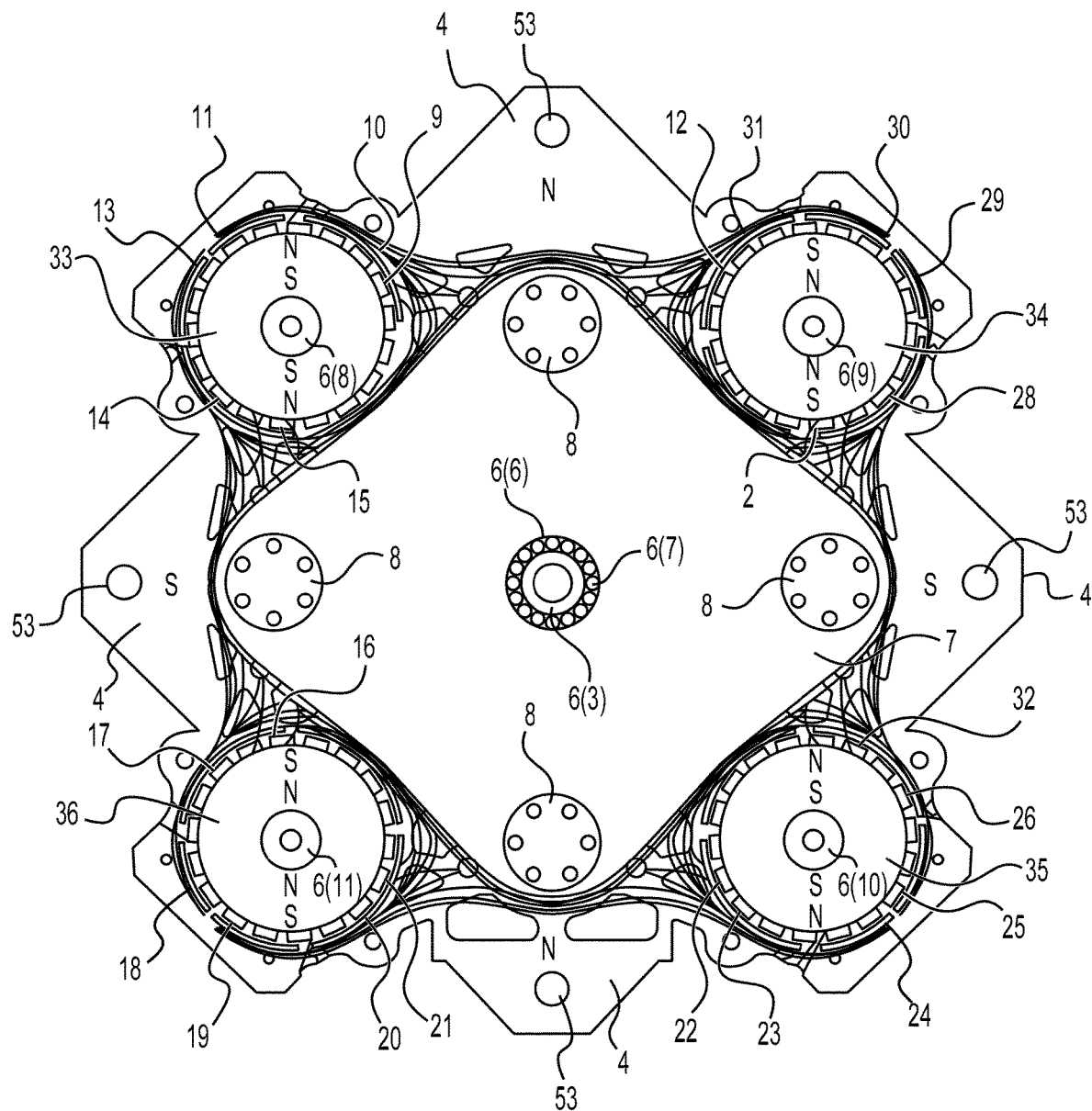
FIG. 3 is a diagram illustrating the cross-sectional view of the end portion of the stator revealing a geometric arrangement of the rotor cavities, wire slots with stator winding in place along with mu metal shielding, stator end compression plate, magnetic rotors, and central drive shaft, consistent with embodiments of the present disclosure.

FIG. 3 is a diagram illustrating an exemplary cross-sectional view of an exemplary end portion of the stator revealing the geometric arrangement of rotor cavities, wire slots with stator induction windings in place along with mu metal shielding, stator end compression plate along with exemplary magnetic rotors and rotor drive shafts. An exemplary generator with the above described configuration may operate with uni-pole rotors. Exemplary rotors 33, 34, 35 and 36 are made of permanent magnets of neodymium or like material, for example, and are on rotor drive shafts 6(8)-6(11). In a preferred embodiment, the four rotors are uni-polar for the entire 360° of each rotor with a first polarity on the outer surface and a second polarity on the inner surface for one rotor and a second polarity on the outer surface and a first polarity on the inner surface of the adjoining rotor, as illustrated. That is, rotor cavity #1 contains a north magnetic rotor 33, rotor cavity #2 a south magnetic rotor 34, rotor cavity #3 contains a north magnetic rotor 35, and rotor cavity #4 contains a south magnetic rotor 36. Thus, slot rotors 33, 34, 35, 36 distributed along the outer periphery alternate geometrically between a first magnetic polarity to a second magnetic polarity as illustrated.

Figure 4:
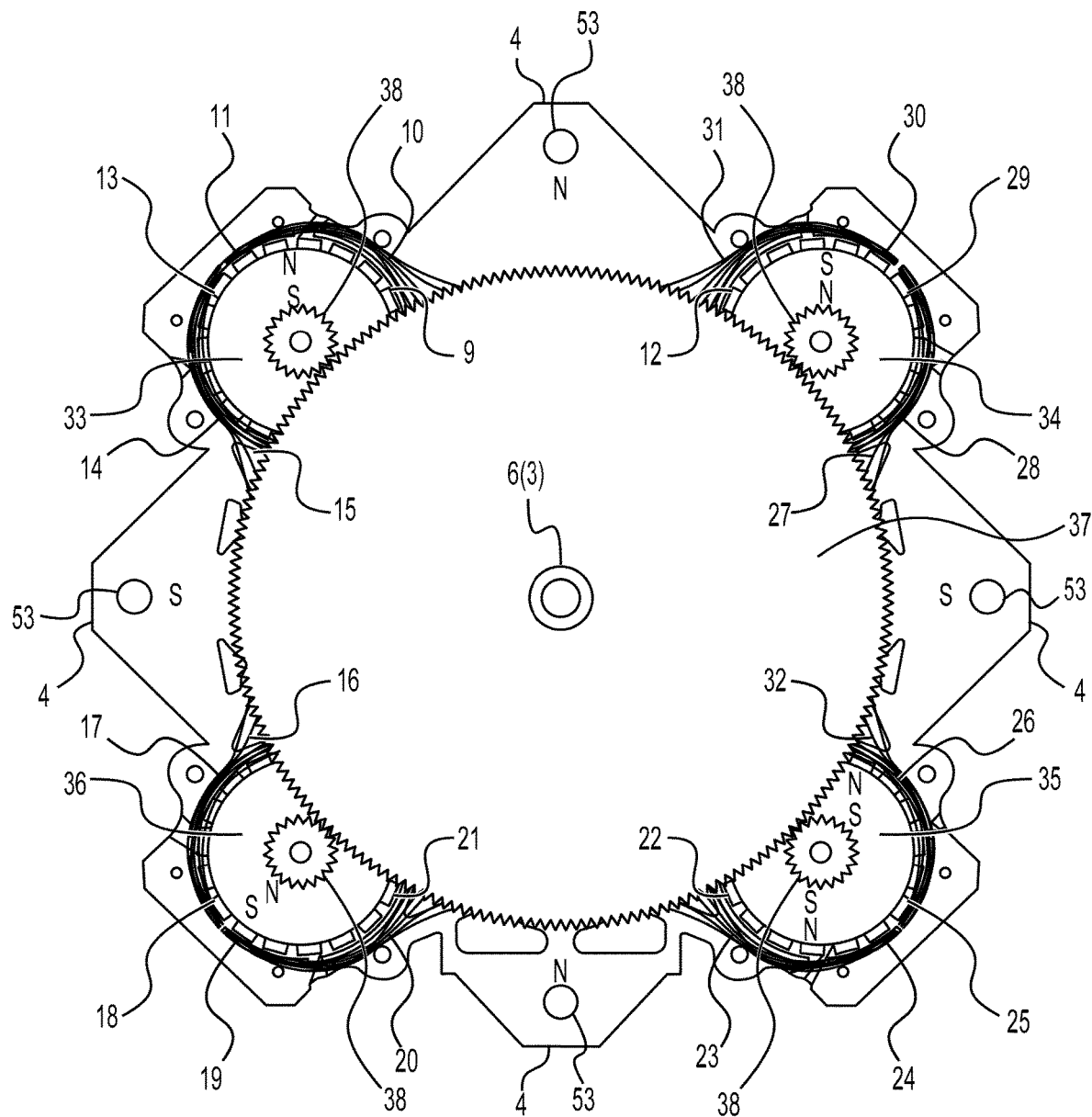
FIG. 4 is a diagram illustrating a cross-sectional view of the end portion of the stator revealing the geometric arrangement of the rotor cavities, wire slots with stator windings in place along with mu metal shielding, stator end compression plate, magnetic rotors, and rotor drive wheel mounted on central drive shaft, consistent with embodiments of the present disclosure.

FIG. 4 is a diagram illustrating an exemplary cross-sectional view of an exemplary driver end portion of the stator. FIG. 4 is identical to FIG. 3 but with the addition of central drive cog wheel 37 on drive shaft 6(3) and meshing with shaft cog wheels 38 on all four rotors 33-36.

Figure 5:
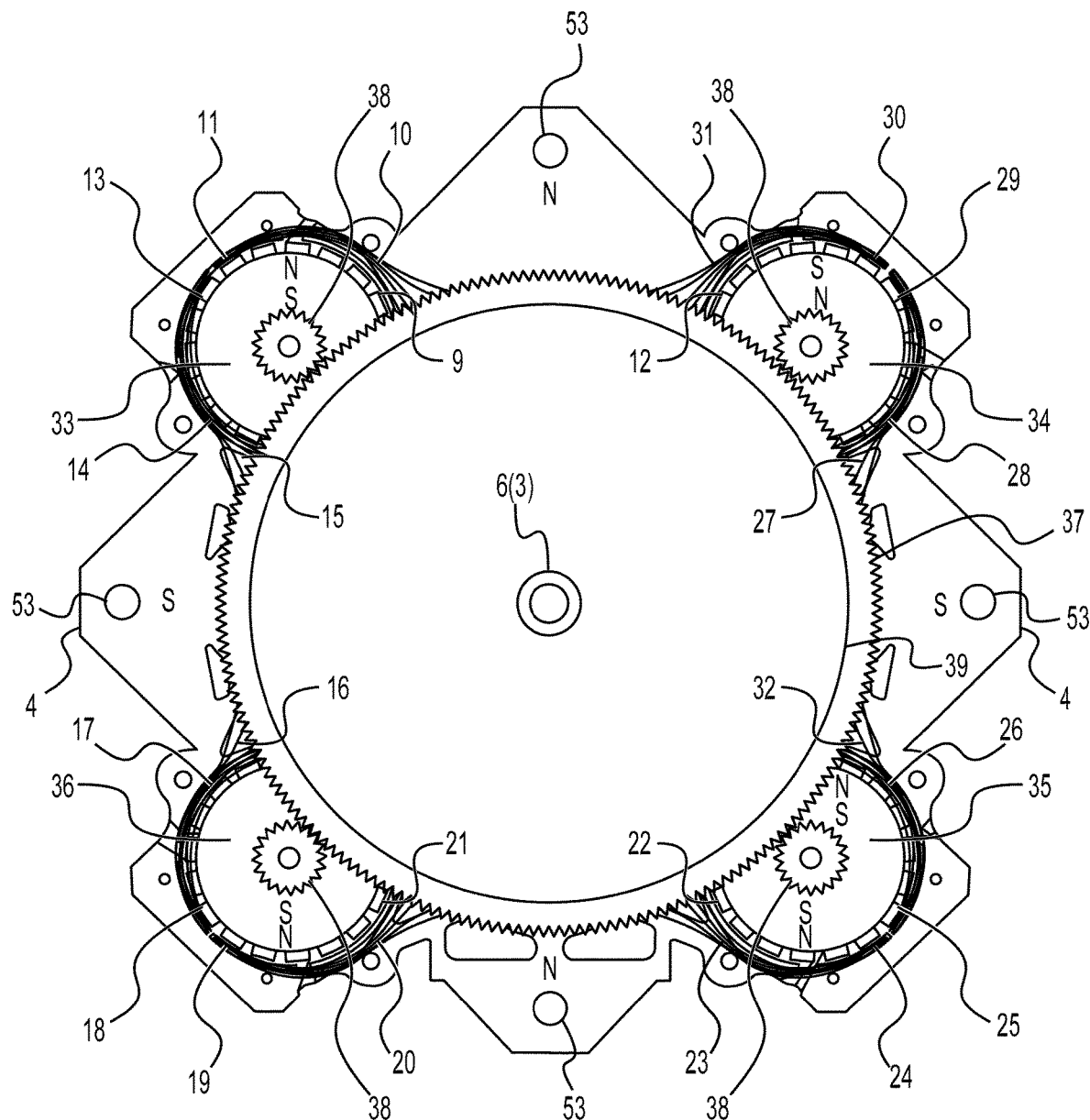
FIG. 5 is a diagram illustrating a cross-sectional view of end portion of the stator revealing the geometric arrangement of the rotor cavities, wire slots with stator windings in place along with mu metal shielding, stator magnetic rotors, drive wheel, mu metal spacer plate, and drive shaft, consistent with embodiments of the present disclosure.

FIG. 5 is identical to FIG. 4 with the addition an exemplary mu metal laminate 39 on drive wheel 37. It functions to separate magnetic fields of the drive motor mechanism described with reference to FIG. 6 from the rotor 33-36 magnetic poles.

Figure 6:
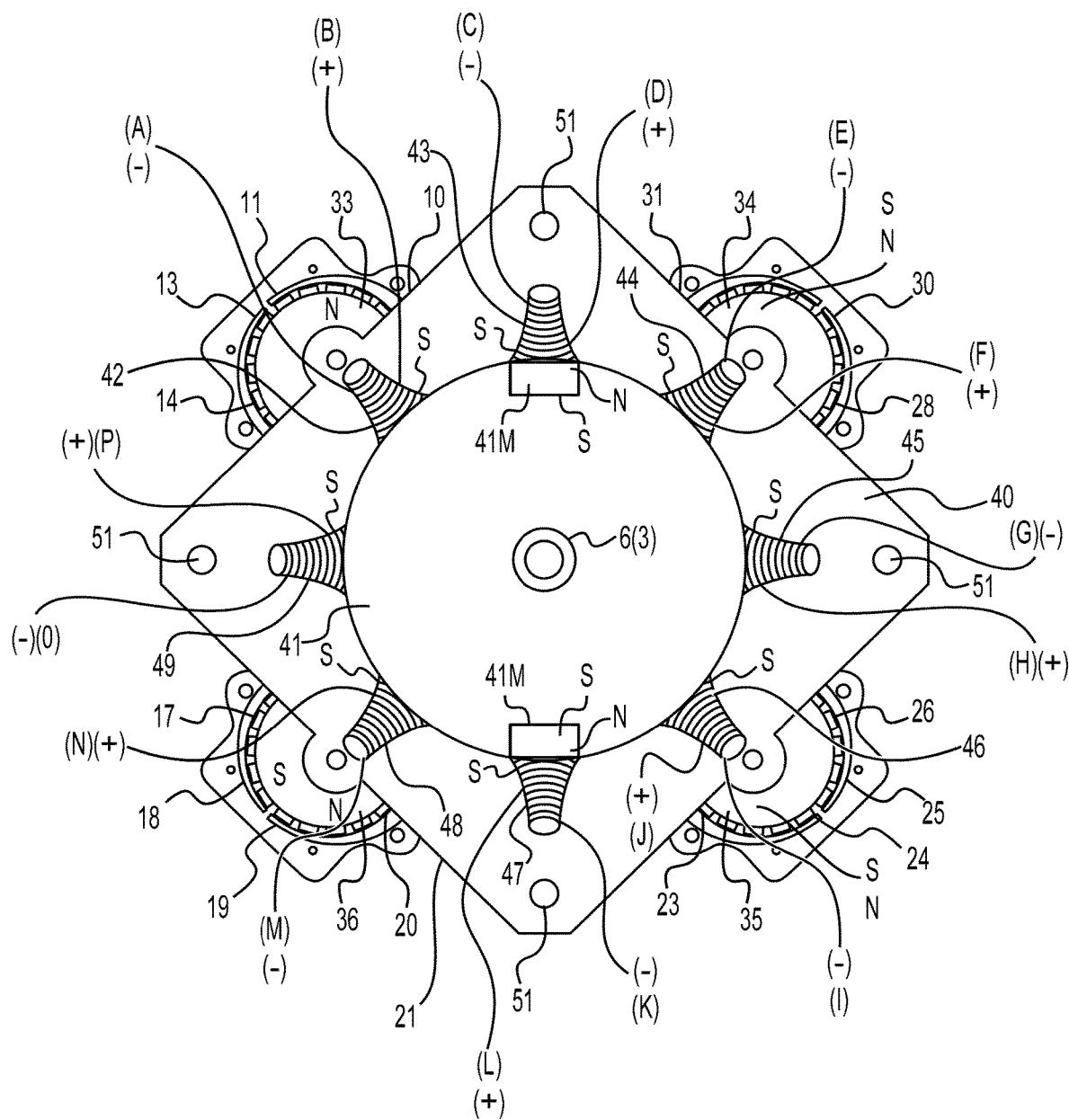
FIG. 6 is a diagram illustrating a cross-sectional view of the end portion of the stator from the drive end revealing the geometric arrangement of the rotor cavities, wire slots with stator windings in place along with mu metal shielding, magnetic rotors, magnetic rotor shaft bearing support structure with electromagnetic drive poles, and a drive wheel attached to central drive shaft, consistent with embodiments of the present disclosure.

FIG. 6 is a diagram illustrating an exemplary cross-sectional view of the end portion of the stator from the drive end perspective revealing exemplary magnetic rotor shaft bearing shaft support structures with exemplary electromagnetic drive poles and drive wheel attached to drive shaft 6(3). FIG. 6 is identical to FIG. 5 with the addition of an exemplary steel/mu metal laminate 40 which functions as a magnetic shield and support structure for motor mechanism electromagnets 42, 43, 44, 45, 46, 47, 48 and 49 and their coil leads. Laminate 40 also contains supporting structure for the four rotor drive shafts 6(8)-6(11), which supporting structure is unnumbered in the drawing.

As noted above, slot rotors 33, 34, 35, 36 distributed along the outer periphery alternate geometrically between first magnetic polarities to second magnetic polarities. The rotors are rotated by a drive wheel which is driven by a direct current motor device system. The motor device system includes thin non-ferro magnetic disc drive wheel 41, containing two static magnets 41M in the outer periphery 180° separated. The disc is mounted on central drive shaft 6(3). The disc can be rotated at 3,000 rpm, but not limited to 3,000 rpm, by energized electromagnets 42-49 mounted upon the support structure, for example, laminate 40. There are eight, but not limited to eight, electromagnets 42-49 spaced 45° apart in proximity to the edge of disc 41 with the south poles S adjacent the periphery of disc 41. Static magnets 41M on the outer periphery of driver disc 41 are placed such that north pole faces the outer periphery and the rotating south pole S fields generated by electromagnets 42-49. The south pole S of each magnet 41M faces the inner periphery of disc 41. When two of the electromagnets 42-49 180° apart are excited for 5 milliseconds in sequence, 360° of rotation occurs in 20 milliseconds or 3,000 rpm.

Figure 8:
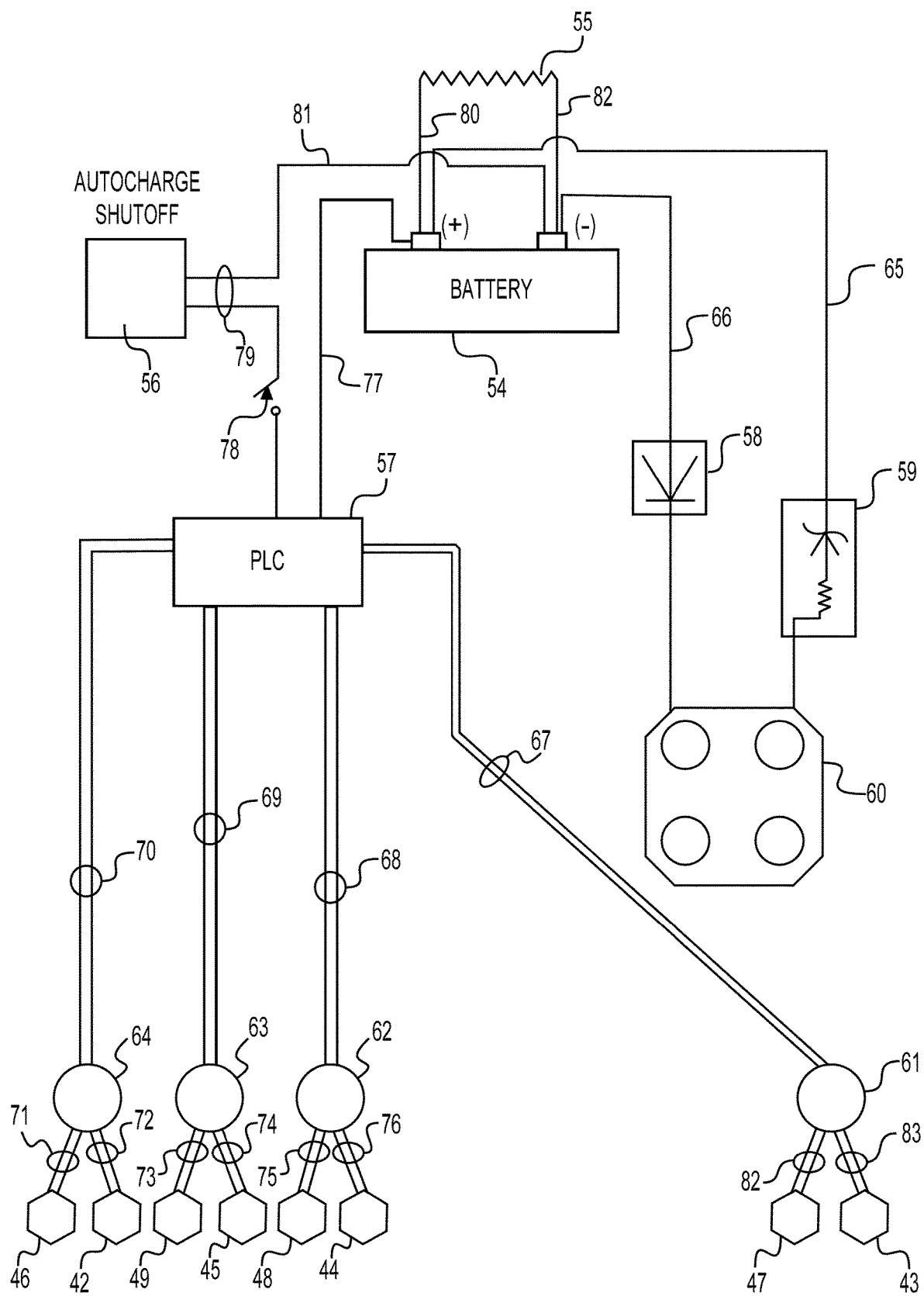
FIG. 8 is a diagram illustrating an exemplary schematic of the generator disclosed herein, consistent with embodiments of the present disclosure.

The eight electromagnets 42-49 are excited by four relays 61-64 which are controlled by PLC 57 illustrated in FIG. 8. Each relay closes a DC circuit to two of the electromagnets distributed 180° apart adjacent the circumference of drive wheel 41 through leads 71-76 and 82-83 in FIG. 8. The leads are shown in FIG. 6 as (I)(−)/(J)(+), (A)(−)/(B)(+), (O)(−)/(P)(+), (G)(−)/(H)(+), (M)(−)/(N)(+), (E)(−)/(F)(+), (K)(−)/(L)(+), (C)(−)/(D)(+), respectively. The excitation can be for a duration of 2.5 milliseconds, but not limited to 2.5 milliseconds, followed by a rotational excitation by the three remaining relays each being excited for a duration of 2.5 milliseconds. This excitation in sequence allows the disc to spin at a speed of 10 milliseconds per rotation or 6,000 rpm.

Drive wheel 41 in FIG. 6 is connected to drive wheel 39 in FIG. 5 by central drive shaft 6(3). Drive wheel 39 in FIG. 5 is connected by drive shaft 6(3) to a thin cogged drive wheel 37. Cogged wheel 37 meshes with small cogged wheels 38 on drive shafts 6(8)-6(11) of each of four rotors 33-36, shown in FIG. 5. The ratio of larger wheel 37 to smaller wheels 38 can be 1-10; therefore, when driver wheel 37 is operating at 6,000 rpm's, rotor cogged wheels 38 operate at 60,000 rpm's.

Figure 7:
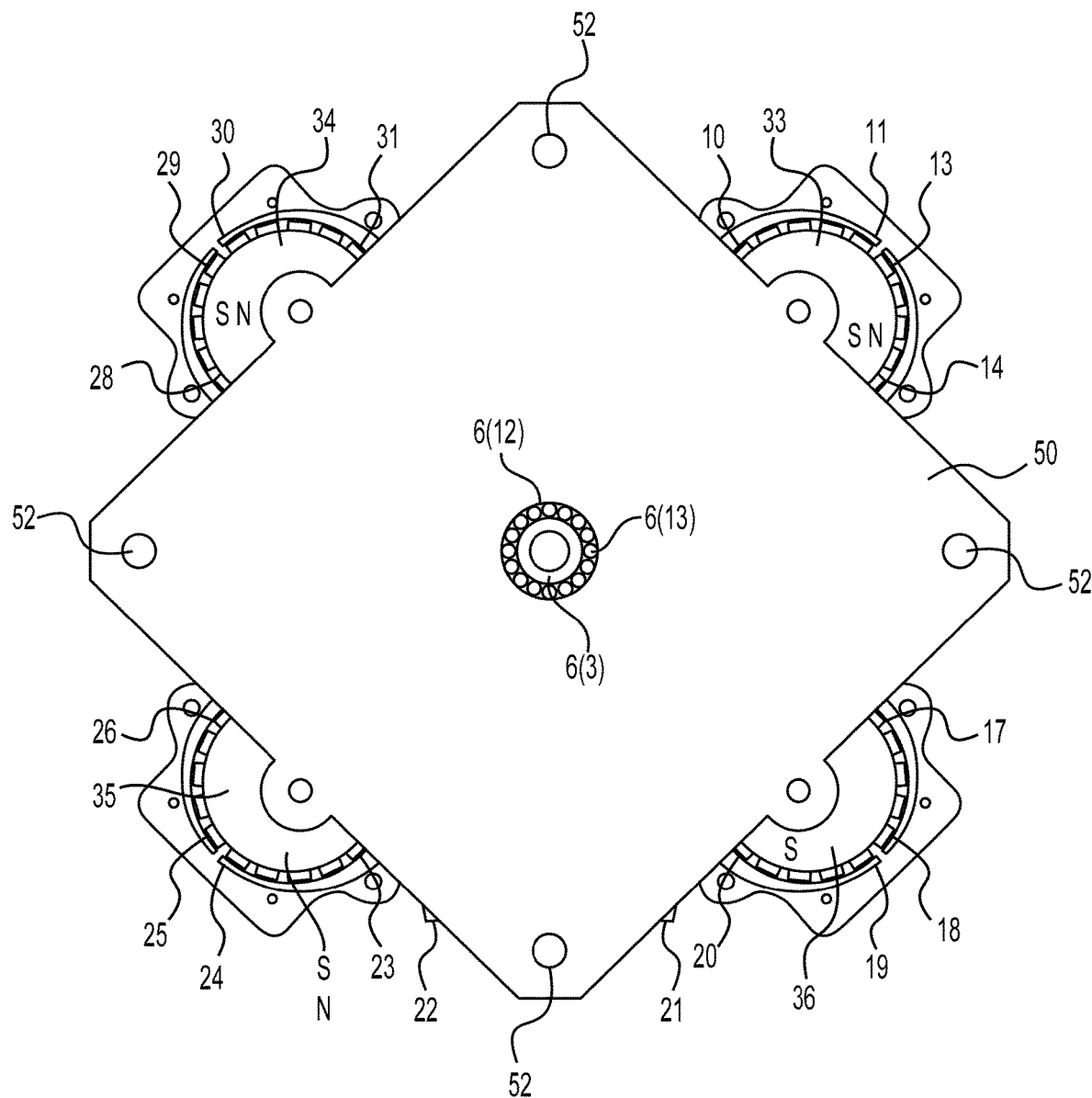
FIG. 7 is a diagram illustrating a cross-sectional view of an exemplary non-drive end portion of the stator revealing the geometric arrangement of the rotor cavities and wire slots along with stator windings in place, mu metal shielding, and non-drive end compression plate containing central drive shaft, consistent with embodiments of the present disclosure.

FIG. 7 is a diagram illustrating an exemplary cross-sectional view of an exemplary non-drive end portion of the stator revealing non-drive end compression plate 50. Plate 50 contains cavities 52 as well as support structure (unnumbered) for the four rotor drive shafts.

FIG. 8 is a diagram illustrating an exemplary schematic of the generator disclosed herein. When switch 78 is closed, power flows from battery 54 through conduits 81 and 77 into PLC 57. The PLC sends sequential signals, for example, 5 millisecond signals, through conductors 67, 68, 69 and 70 to relays 64, 63, 62 and 61. Each relay sends an excitation current to pairs of electromagnetic poles (46, 42; 49, 45; 48, 44; and 47, 43 in FIG. 6) separated 180° from each other and the excitation is in a rotating 5 millisecond sequence. Relay 61 activates magnetic poles 47 and 43 through conduits 82, 83, relay 62 activates poles 48 and 44 through conduits 75, 76, relay 63 activates poles 49 and 45 through conduits 73, 74, and relay 64 activates poles 46 and 42 through conduits 71, 72. Drive wheel 41, shown in FIG. 6, can drive wheel 39 and, thus, drive wheel 37, shown in FIG. 5, at 3,000 rpm and the meshed rotor cog wheels 38 rotate consequently at 30,000 rpm, thereby generating DC power in generator 60, a preferred embodiment of which is described above. Generator 60 is connected to battery 54 by conduit 65 which includes voltage regulator 59 and conduit 66 and its unidirectional blocking diode 58. The battery power drives the generator and powers a load 55 through conductors 80 and 82. The unit can be turned off by the on/off switch 78 or by an auto-charged shut-off 56, for example, by a MOSFET transistor which opens the circuit when the battery is fully charged or needs additional charge. When these operating conditions are met the unit can operate at a power in to power out ratio of approximately 1:20.

The invention claimed is:

1. A power generator, comprising:
a stator having slots and stator coils; and
a series of slot rotors placed in relation to the stator coils such that minimal destructive interaction is caused between magnetic fields of each rotor and induced magnetic fields of the stator when the power generator is connected to an electric load, wherein each slot rotor comprises a rotor placed in a respective rotor cavity having at least one of the slots;
wherein first members of the slot rotors are distributed along the outer periphery of a first stator section having induction windings accommodated in the slots;
wherein the first members of slot rotors contain permanent magnets that have a first magnetic polarity on 360° of the external face of the slot rotors, and a second polarity on 360° of the inner face and adjacent to a shaft of the slot rotors.

2. The power generator of claim 1, further comprising: the slots of the first stator section are axially aligned along a lengthwise and depthwise axis.

3. The power generator of claim 1, wherein the slot rotors are distributed along the outer periphery alternating in polarity from the first magnetic polarity to the second magnetic polarity.

4. The power generator of claim 1, wherein the slot rotors are configured such that the first pole having the first magnetic polarity and the second pole having the second magnetic polarity are located in geometrically adjacent corners of the stator body.

5. The power generator of claim 4, wherein the first side of a stator armature coil is excitable by the first magnetic polarity while a second side of the same stator armature coil is excitable by the second magnetic polarity such that a moving flux density is provided in the induction windings to induce a DC current to flow therein.

6. The power generator of claim 3, further comprising a drive wheel for rotation of the slot rotors.

7. The power generator of claim 6, wherein the drive wheel comprises a non-ferromagnetic disc containing two static magnets on the outer periphery separated by 180°.

8. The power generator of claim 7, wherein the magnetic disc is mounted on a central drive shaft by use of a bearing mechanism.

9. The power generator of claim 8, further comprising a plurality of DC electromagnets spaced a predetermined number of degrees apart and in proximity to the edge of the magnetic disc.

10. The power generator of claim 9, wherein the DC magnets are placed on the outer periphery of the magnetic disc such that north pole faces the outer periphery and south pole the inner periphery for each static magnet separated by 180° on the face of the disc.

11. The power generator of claim 9, further comprising a programmable logic center (PLC) and relays, wherein the plurality of electromagnets are excitable by the relays which are controlled by the programmable logic center (PLC).

12. The power generator of claim 11, wherein each relay is operable to close a DC power circuit to two of the electromagnets distributed 180° apart from each other next to the circumference of the magnetic disc.

13. The power generator of claim 12, wherein the programmable logic center (PLC) is configured such that one relay is exited for a predetermined duration followed by a rotational excitation in the remaining relays, each being excited for the predetermined duration.

14. The power generator of claim 13, wherein the excitation in sequence allows the disc to spin at a speed of 10 milliseconds per rotation or 6,000 rpm.

15. The power generator of claim 6, wherein the drive wheel is connected to a central shaft which is also connected to a non-ferromagnetic cog wheel.

16. The power generator of claim 15, wherein the cog wheel on the central shaft meshes with a smaller cog wheel on the shaft of each of the four rotors.

17. The power generator of claim 16, wherein of the cog wheel is set to a predetermined ratio to the smaller cog wheels.

18. The power generator of claim 1, wherein the stator coils include three coil sets.

19. The power generator of claim 18, wherein coils within each coil set are connected in series for generating DC power.

20. The power generator of claim 13, wherein the PLC is programmed to pulse a signal to a relay which in turn closes the DC circuit for the predetermined duration in series.

21. The power generator of claim 20, wherein the PLC is powered by a common battery which also powers an electrical load.

22. The power generator of claim 21, further comprising an on-off switch which breaks the circuit from the common battery to the PLC.

23. The power generator of claim 21, further comprising a MOSFET transistor, which opens the circuit when the common battery is fully charged and closes the circuit when the common battery needs additional charge.

24. The power generator of claim 21, further comprising a transistor voltage regulator that controls the voltage from the power generator to the common battery.

25. The power generator of claim 1, wherein the stator is constructed of laminated electrical steel, or laminated graphene, or a combination of laminated electrical steel and laminated graphene.

26. The power generator of claim 1, wherein the stator coils are made of copper, aluminum, graphene, and/or ceramic.

27. The power generator of claim 1, wherein the stator has a substantially square shape, with rotor cavities located in the corners of the square, where the stator section is concentric about the longitudinal axis.

28. The power generator of claim 1, wherein the slots are wired such that 360° of slots are wound in a counter clockwise direction and are lapped by 360° of slots wound in a clockwise direction between the two adjacent rotor cavities.

29. The power generator of claim 28, wherein the lapped winding is such that an induced north pole cancels an induced south pole thereby electromagnetically isolating the rotor standing magnetic pole from the induced potential stator magnetic pole.

* * * * *